US005288021A

United States Patent [19]

Sood et al.

[11] Patent Number: 5,288,021

[45] Date of Patent: Feb. 22, 1994

[54] INJECTION NOZZLE TIP COOLING

[75] Inventors: Virendra M. Sood, Encinitas; Robie L. Faulkner, Santee, both of Calif.

[73] Assignee: Solar Turbines Incorporated, San Diego, Calif.

[21] Appl. No.: 923,403

[22] Filed: Aug. 3, 1992

[51] Int. Cl.[5] F02C 7/22; B05B 7/10

[52] U.S. Cl. 239/132.5; 239/400; 239/402; 239/406; 239/558; 60/740; 60/742

[58] Field of Search 239/132.5, 400, 402, 239/406, 558; 60/740, 741, 742

[56] References Cited

U.S. PATENT DOCUMENTS

| | | | |
|---|---|---|---|
| 2,567,485 | 9/1951 | Jenny | 239/406 |
| 3,483,700 | 12/1969 | Ryberg et al. | 60/39.74 |
| 3,630,024 | 12/1971 | Hopkins | 60/742 |
| 3,684,186 | 8/1972 | Helmrich | 239/400 |
| 3,866,413 | 2/1975 | Sturgess | 60/39.74 |
| 3,886,736 | 6/1975 | Kawaguchi | 239/402 X |
| 4,096,996 | 6/1978 | Ketchum, Jr. | 239/406 |
| 4,116,388 | 9/1978 | Trozzi | 239/406 |
| 4,483,137 | 11/1984 | Faulkner | 60/39.55 |
| 4,600,151 | 7/1986 | Bradley | 239/400 |
| 4,609,150 | 9/1986 | Pane, Jr. et al. | 239/406 X |
| 4,773,596 | 9/1988 | Wright et al. | 239/400 |
| 4,798,330 | 1/1989 | Mancini et al. | 239/8 |
| 4,962,889 | 10/1990 | Halvorsen | 239/410 |
| 4,977,740 | 12/1990 | Madden et al. | 60/39.463 |
| 5,014,918 | 5/1991 | Halvorsen | 239/410 |

*Primary Examiner*—Andres Kashnikow
*Assistant Examiner*—William Grant
*Attorney, Agent, or Firm*—Larry G. Cain

[57] ABSTRACT

Past systems have attempted to cool the combustor end or tip of fuel injection nozzles, however, such methods have failed to attain adequate cooling and life. The present system or structure for cooling a tip or combustion end of a fuel injection nozzle is accomplished with a twofold structure. First, a plurality of openings being acutely positioned in the combustor end about a plurality of base circles provide effective air-sweep cooling. Secondly, the convection cooling of a back face and a combustion face provides effective convection cooling. The two structures are combined to provide an effective, efficient cooling of the combustor end or tip. The combustor end of the fuel injection nozzle is maintained at a temperature low enough to prevent failure of the combustor end through oxidation, cracking and buckling and the air-sweep avoids carbon deposits on the combustor face.

6 Claims, 5 Drawing Sheets

INJECTION NOZZLE TIP COOLING

TECHNICAL FIELD

This invention relates generally to gas turbine engines and more particularly to the cooling of a fuel injection nozzle used therewith.

BACKGROUND ART

The front face of a fuel injection nozzle is exposed to high temperature combustion gases that can reach temperatures as high as 2200 degrees C. Due to the extremely high levels of turbulence generated by swirl and primary zone jets, the heat transfer rates to the fuel injection nozzle tip are increased, it is important that the front face of the fuel injection nozzle tip be adequately cooled. Typical cooling techniques include convection and air-sweep cooling.

If a convection cooled fuel injection nozzle tip is cooled excessively, it tends to accumulate deposits of combustion generated carbon that can interfere with fuel atomization and dispersion, resulting in poor combustion efficiency and hot spots. If the injector is allowed to run at temperatures higher than 800 degrees C., failure of the front face can cause secondary damage to the combustor walls through oxidation, cracking, and buckling. The combustor exit temperature profile and pattern factor can deteriorate, resulting in damage to the downstream gas turbine components.

An example of past injection nozzles in which an attempt has been made to cool the front face is disclosed in U.S. Pat. No. 4,977,740 issued on Dec. 18, 1990 to Thomas J. Madden et al. The injection nozzle disclosed includes an air passage through which cooling air is directed into contact with the inside surface of a conical deflector portion of a conical deflector section. Thus, an attempt to cool the tip by convection at the inner surface is disclosed.

Another example of an injection nozzle attempting to cool a front face is disclosed in U.S. Pat. No. 4,798,330 issued on Jan. 17, 1989 to Alfred A. Mancini et al. Cooling air passes through an air swirl chamber and terminates in an outer air discharge orifice. A portion of the air exits an aperture in the front face and is used to attempt to cool the front face.

Another example of an injection nozzle attempting to cool a front face is disclosed in U.S. Pat. No. 4,600,151 issued on Jul. 15, 1986 to Jerome R. Bradley. The injection nozzle disclosed includes an air passage through which cooling air is directed into contact with the inside surface of a frusto-conical portion of a shroud member.

Another example of an injection nozzle attempting to cool a front face is disclosed in U.S. Pat. No. 3,866,413 issued Feb. 18, 1975 to Geoffrey J. Sturgess. Cooling air enters through a plurality of ports and cools the dome.

Another example of an injection nozzle attempting to cool a front face is disclosed in U.S. Pat. No. 3,684,186 issued Aug. 15, 1972 to William F. Helmrich. This patent discloses a secondary air swirl chamber formed by a portion of a shroud. The air exiting the chamber partially cools the front face prior to being mixed with fuel.

Another example of an injection nozzle is disclosed in U.S. Pat. No. 3,483,700 issued Dec. 16, 1969 to John G. Ryberg et al. The patent discloses a front face having a plurality of scoops formed therein. A mixture of fuel and air pass through the scoops into a combustion chamber. The mixture of fuel and air attempts to cool the front face.

Many attempts have been made to improve front face cooling and to extend the life of fuel injection nozzles. Experimentation has shown that it is difficult to achieve optimum front face temperature with both gaseous and liquid fuels over the complete range of loads and ambient conditions in a gas turbine engine. Thus, using convective cooling or air-sweep alone does not appear to solve the front face cooling problem. It appears that a combination of convective cooling and air-sweep cooling usually has better durability. This is due to the lower front face temperature and avoidance of carbon deposits by air-sweeping action.

DISCLOSURE OF THE INVENTION

In one aspect of the invention a fuel injection nozzle has a central axis and is comprised of an outer casing coaxially positioned about the central axis. A combustor end is attached to the outer casing and has a combustor face and a back face. A member is attached within the outer casing and forms a chamber therebetween which is in fluid communication with a source of gaseous fuel. An air chamber is formed between the combustor end and the member. A plurality of openings are formed in the combustor end between the combustor face and the back face. The plurality of openings communicate with the compressed air in the air chamber.

In another aspect of the invention a dual fuel injection nozzle has a central axis and is comprised of an outer casing coaxially positioned about the central axis. A combustor end is attached to the outer casing and has a combustor face and a back face. A member is attached within the outer casing and forms a chamber therebetween being in fluid communication with a source of gaseous fuel. An annular groove is positioned in the member and is in fluid communication with a source of liquid fuel. An air chamber is formed between the combustor end and the member and is in fluid communication with a source of compressed air. A plurality of openings are formed in the combustor end between the combustor face and the back face. The plurality of openings communicate with the compressed air in the air chamber.

BEST MODE FOR CARRYING OUT THE INVENTION

Figure 1:
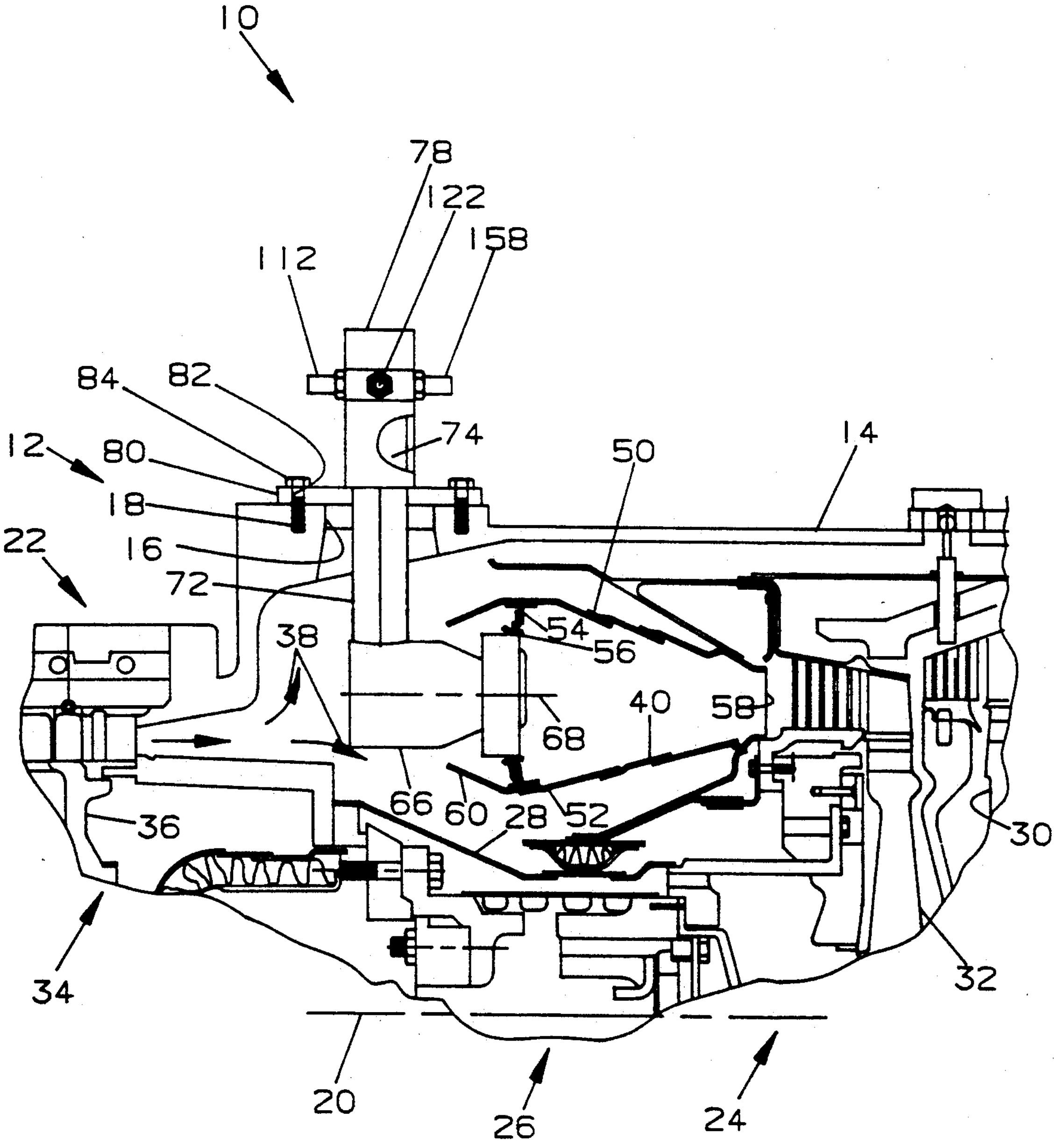
FIG. 1 is a partially sectioned side view of a gas turbine engine having an embodiment of the present invention.

In reference to FIG. 1, a gas turbine engine 10 having a fuel injection nozzle 12 is shown. The gas turbine engine 10 has an outer housing 14 having therein a plurality of openings 16 having a preestablished position and relationship one to another. A plurality of threaded holes 18 are positioned relative to the plurality of openings 16. The housing 14 further includes a central axis 20. The housing 14 is positioned about a compressor section 22 centered about the axis 20, a turbine section 24 centered about the axis 20 and a combustor section 26 positioned operatively between the compressor section 22 and the turbine section 24.

The engine 10 has an inner case 28 coaxially aligned about the axis 20 and is disposed radially inwardly of the compressor section 22, turbine section 24 and the combustor section 26. The turbine section 24 includes a power turbine 30 having an output shaft, not shown, connected thereto for driving an accessory component such as a generator. Another portion of the turbine section 24 includes a gas producer turbine 32 connected in driving relationship to the compressor section 22. The compressor section 22, in this application, includes an axial staged compressor 34 having a plurality of rows of rotor assemblies 36, of which only one is shown. When the engine 10 is operating, the compressor 34 causes a flow of compressed air exiting therefrom designated by the arrows 38. As an alternative, the compressor section 22 could include a radial compressor or any source for producing compressed air. In this application, the combustor section 26 includes an annular combustor 40 being radially spaced a preestablished distance from the outer housing 14 and the inner case 28. Other combustor geometries may be equally suitable. The combustor 40 is supported from the inner case 28 in a conventional manner. The combustor 40 has a generally cylindrical outer shell 50 being coaxially positioned about the central axis 20, a generally cylindrical inner shell 52 being coaxial with the outer shell 50, an inlet end 54 having a plurality of generally evenly, circumferentially spaced openings 56 therein and an outlet end 58. In this application, the combustor 40 is constructed of a plurality of generally conical or cylindrical segments 60. The outer shell 50 extends generally between the inlet end 54 and the outlet end 58. Each of the openings 56 has a single fuel injection nozzle 66 having a central axis 68 positioned therein, in the inlet end 54 of the combustor 40. As an alternative to the annular combustor 40, a plurality of can type combustors could be incorporated without changing the gist of the invention.

Figure 2:
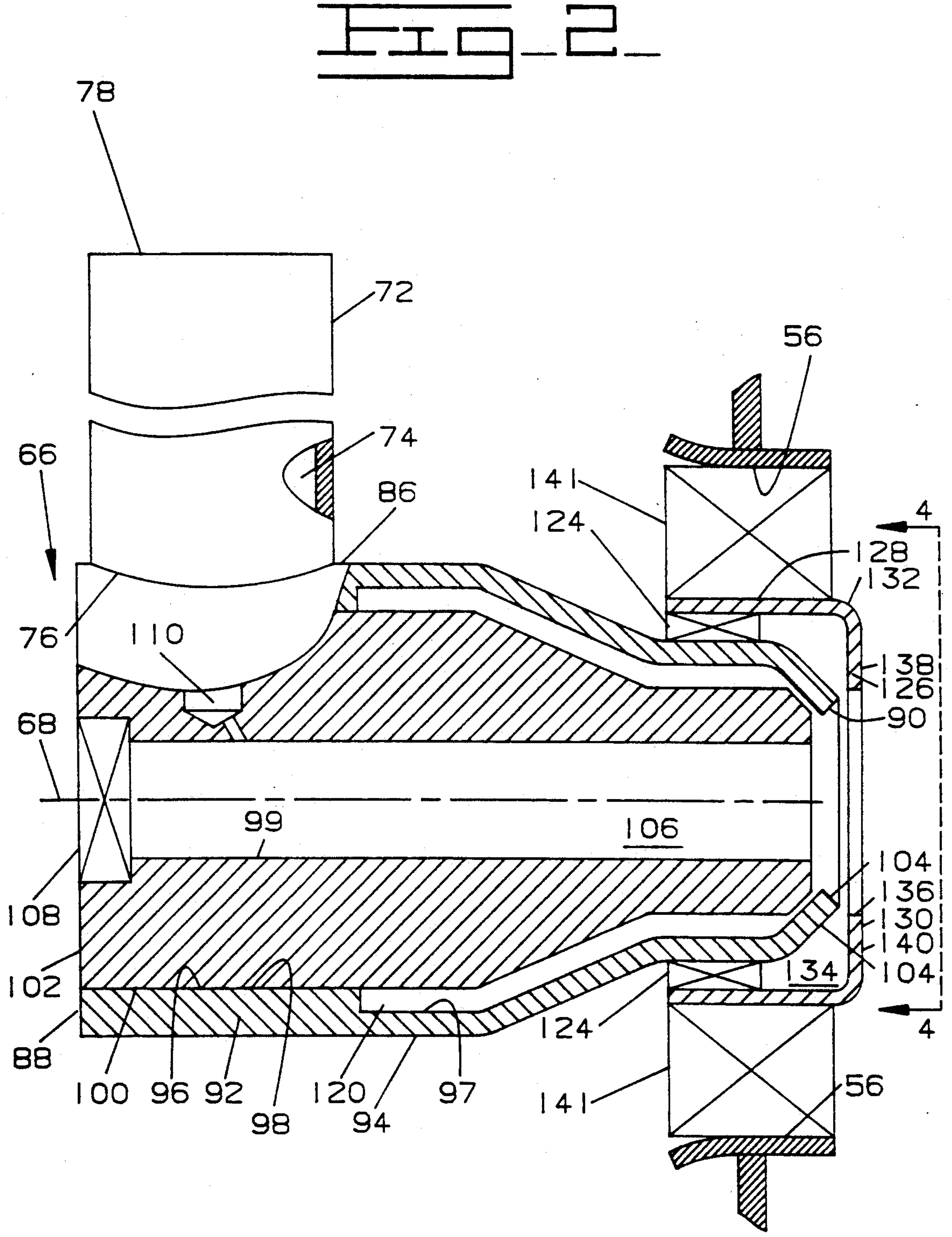
FIG. 2 is an enlarged sectional view of a single fuel injection nozzle used in one embodiment of the present invention.

As further shown in FIG. 2 in this application, each of the single fuel injection nozzles 66 is supported from the housing 14 in a conventional manner. For example, an outer tubular member 72 has a passage 74 therein. The tubular member 72 includes an outlet end portion 76 and an inlet end portion 78. The tubular member 72 extends radially through one of the plurality of openings 16 in the outer housing 14 and has a mounting flange 80 extending therefrom. The flange 80 has a plurality of holes 82 therein in which a plurality of bolts 84 threadedly attach to the threaded holes 18 in the outer housing 14. Thus, the injector 66 is removably attached to the outer housing 14.

The single fuel injection nozzle 66 further includes a generally cylindrical outer casing 86 being attached to the outlet end portion 76 of the tubular member 72. The outer casing 86 has a first end 88 and a second end 90 having a generally frusto-conical shape. A wall 92 of the casing 86 has a stepped configuration and defines an outer surface 94 and an inner surface 96 having a major diameter 97 and a minor diameter 98. The casing 86 is coaxially positioned about the central axis 68 and has an inner cylindrical member 99 attached therein having an outer surface 100 in contacting relationship to the minor diameter 98 of the inner surface 96. The inner cylindrical member 99 has a first end portion 102 which aligns with the first end 88 of the outer casing 86, a second end portion and a central passage 106 extending between the end portions 102,104. Positioned in the central passage 106 near the first end portion 102 is a swirler 108. A passage 110 communicates with the central passage 106 and with a longitudinally extending passage (not shown) in the outer member 72. A fitting 112 is shown in FIG. 1 and communicates with the passage 110 and with the source of gaseous fuel.

A chamber 120 is formed between the major diameter of the inner surface 96 of the casing 86 and the outer surface 100 of the inner cylindrical member 99. The chamber 120 is in fluid communication with a longitudinally extending passage (not shown) in the outer member 72. A fitting 122 is shown in FIG. 1 and communicates with the chamber 120 and a source of gaseous fuel (not shown).

The fuel injection nozzle 66 further includes a plurality of swirlers 124 attached to the outer surface 94 near the second end 90 of the casing 86. A combustor end 126 or tip having a generally cylindrical straight portion 128 is attached to the swirlers 124. The combustor end 126 further includes a radial wall portion 130 and a connector portion 132 interposed the straight portion 128 and the wall portion 130 forming an air chamber 134 between the combustor end 126 and the generally frusto-conical shape of the second end portion 90 of the outer casing 86. The radial wall portion 130 has a passage 136 therein being coaxially positioned about the central axis 68, a combustor face 138 and a back face 140. A plurality of swirlers 141 are attached to the straight portion 128 on the side opposite the plurality of swirlers 124 and are in contacting relationship with the openings 56 in the combustor 40.

Figure 4:
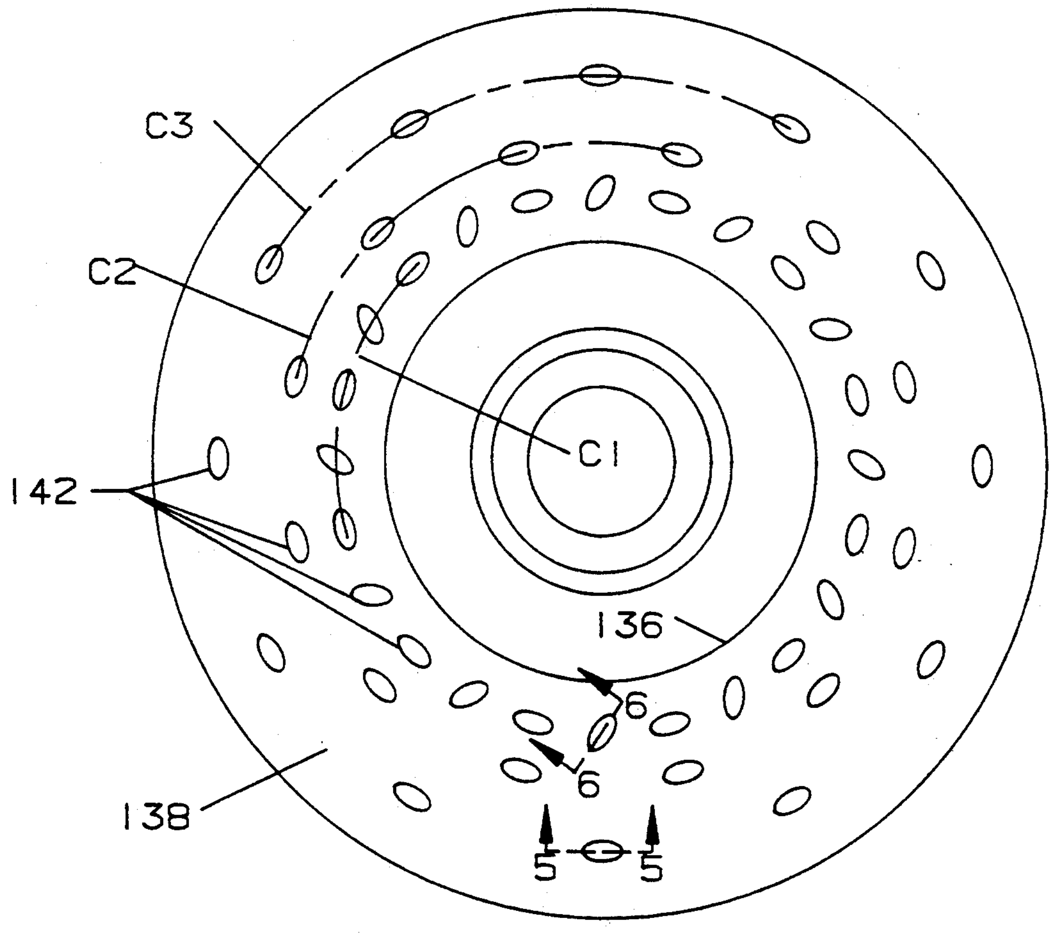
FIG. 4 is an enlarged end view of a single fuel injection nozzle taken along line 4—4 of FIG. 2.
Figure 5:
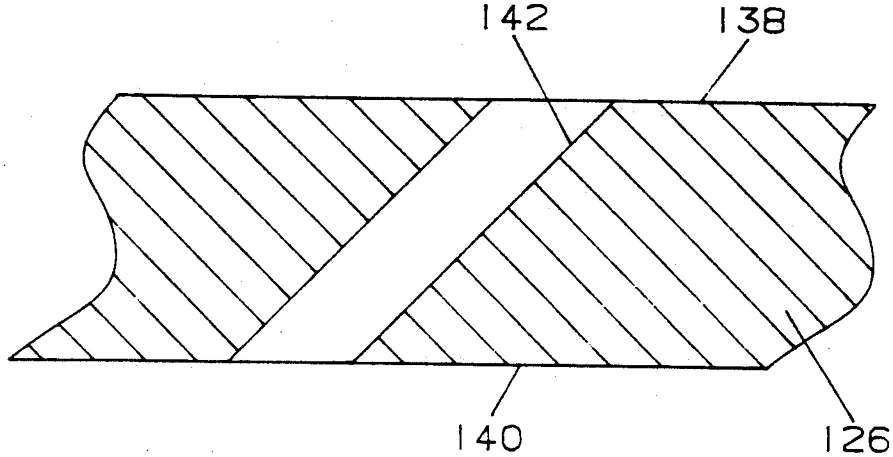
FIG. 5 is a partially sectioned enlarged partial view taken along line 5—5 of FIG. 4.
Figure 6:
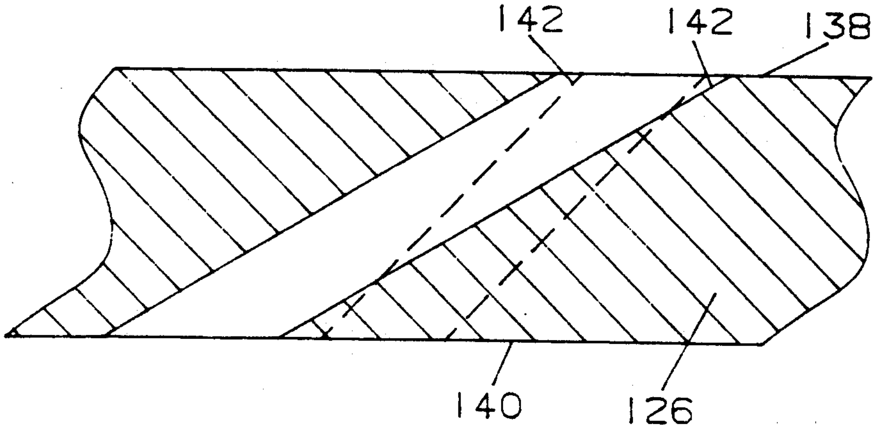
FIG. 6 is a partially sectioned enlarged partial view taken along line 6—6 of FIG. 4.

As best shown in FIGS. 4, 5 and 6, a plurality of openings 142 extend between the back face 140 and the combustor face 138 and communicate with the air chamber 134. The plurality of openings 142 are at an acute angle to the combustion face 138 and are radially spaced about the central axis 68. The acute angle of the plurality of openings 142 to the combustor face 138 is in a range of between about 15 to 45 degrees. The radial spacing of the plurality of openings 142 about the central axis 68 form a plurality of base circles. A portion of the plurality of base circles have the plurality of openings 142 tangent to the base circle and a portion of the plurality of base circles have the plurality of openings 142 at an acute angle to the base circle which falls within the range of from about 15 to 45 degrees. For example, in this application, as best shown in FIG. 4, the combustor face 138 has three base circles labeled C1, C2 and C3. Each of the plurality of openings 142 on the base circles C2 and C3 is tangent to the centerline of the base circle and is at an acute angle to the combustor face 138 of about 30 degrees and includes 12 evenly spaced holes having a diameter of about 0.8 mm. Each individual positioning relationship of the plurality of openings 142 on the base circles C2 and C3 is identical one to the other. The plurality of openings 142 in each of the base circles C1, C2 and C3 is offset by about 10 degrees. On the base circle C1 every other one of the plurality of openings 142 on the base circles is tangent to the centerline of the base circle and is at an acute angle to the combustor face 138 of about 30 degrees and includes 12 evenly spaced holes having a diameter of about 0.8 mm.

The other ones of the plurality of openings 142 is at an acute angle of about 30 degrees to the centerline of the base circle and about 30 degrees to the combustor face 138 and includes 12 evenly spaced holes having a diameter of about 0.8 mm. As an alternative, individual openings 142 could have different diameters or sizes, could be at different acute angles to the base circle and could be at different acute angles to the combustor face 138 within different base circles.

Figure 3:
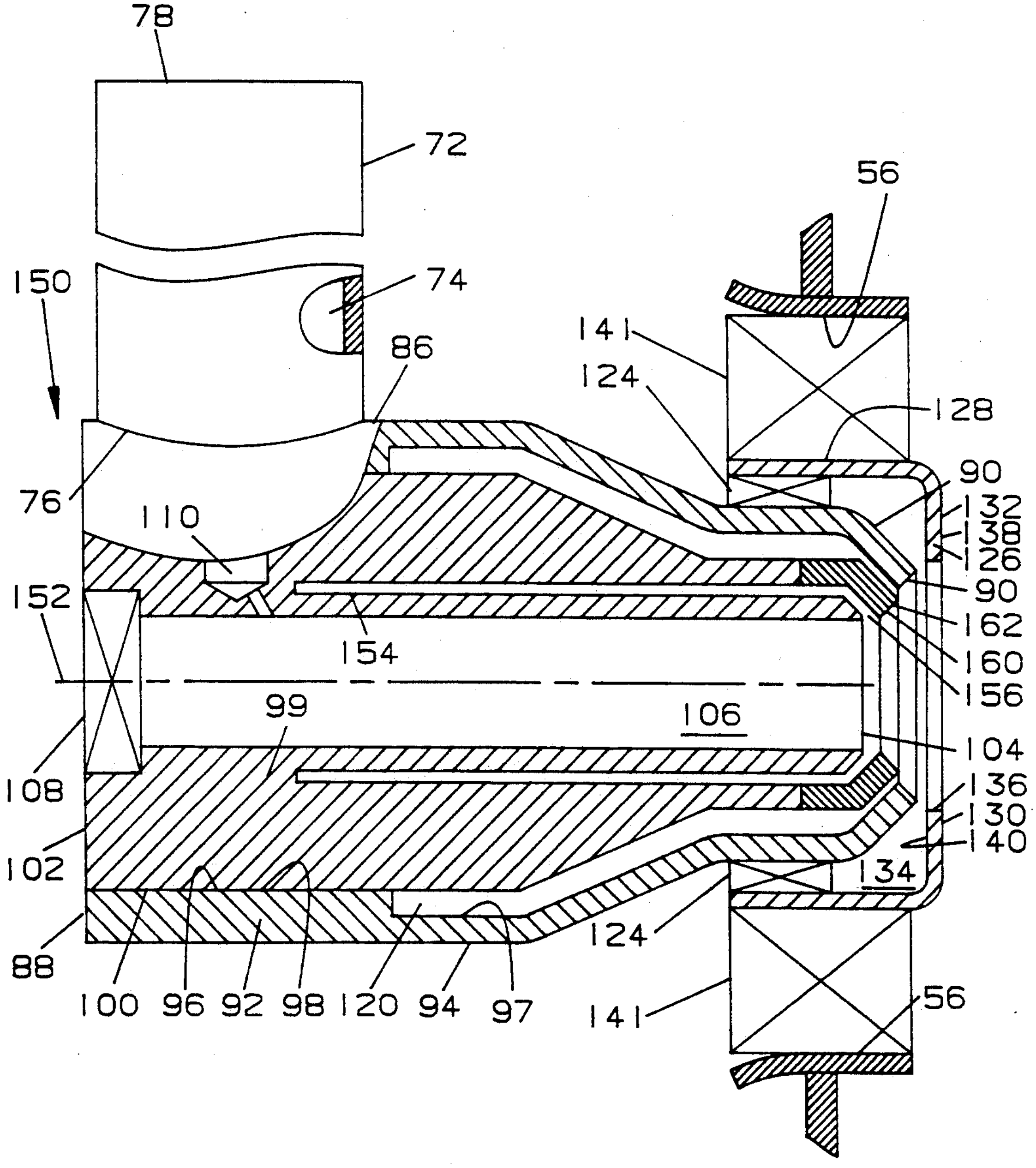
FIG. 3 is an enlarged sectional view of an alternate embodiment of a dual fuel injection nozzle used in one embodiment of the present invention.

As an alternative, and best shown in FIG. 3, a dual fuel type injector 150, gaseous and liquid, can be used in place of the single gaseous fuel injector 66. Where applicable, the nomenclature and reference numerals used to identify the dual fuel type injector 150 is identical to that used to identify the single gaseous fuel type injector 66. Each of the injectors 150 has a central axis 152 and is supported from the outer housing 14 in a conventional manner. For example, an outer tubular member 72 has a passage 74 therein similar to that shown in FIG. 3.

The dual fuel type injector 150 further includes an annular groove 154 positioned intermediate the central passage 106 in the inner cylindrical member 99 and the chamber 120 formed between the major diameter of the inner surface 96 of the casing 86 and the outer surface 100 of the inner cylindrical member 99. The annular groove 154 has an end 156 exiting the second end portion 104. The annular groove 154 is in fluid communication with longitudinally extending passages (not shown) formed in the outer tubular member 72 for liquid fuel and has a fitting 158 (shown in FIG. 1) communicating with a source of liquid fuel (not shown). A generally frusto-conical member 160 is attached to the inner cylindrical member 99 intermediate the annular groove 154 and the chamber 120. An end portion 162 of the frusto-conical member 160 extends generally beyond the end 156 of the annular groove 154.

INDUSTRIAL APPLICABILITY

In use, the gas turbine engine 10 is started in a conventional manner. Gaseous fuel is introduced through the chamber 120 and exits past the frusto-conical shaped second end 90 of the outer casing 86 into the combustor 40. Compressed air from the axial compressor 34 of the compressor section 22 enters the injection nozzle 66,150 by way of the central passage 106. The swirler 108 within the central passage 106 causes the air to attain a swirling motion prior to entering the combustor 40. The bulk of compressed air to support combustion enters into the combustor 40 through the plurality of swirlers 141 attached to the cylindrical straight portion 128 of the combustor end 126 and positioned in the openings 56 in the inlet end 54 of the inner shell 52. Additional compressed air from the compressor 34 passes through the plurality of swirlers 124 attached to the outer surface 94 of the casing 86 prior to entering the combustor 40. The swirling air from the swirler 124 enters into the air chamber 134 wherein a portion of the air passes between the frusto-conical shaped second end 90 of the outer casing 86 and the back face 140 of the radial wall portion 130 of the combustor end 126. Another portion of the air in the air chamber 134 passes through the plurality of openings 142 in the combustor end 126. The flow of the swirling air from air chamber 134 enters the acutely angled openings 142 relative to the combustion face 138 in base circles C1, C2 and C3 which are tangent to the base circles. The flow of this air extends radially outward from the plurality of openings 142 and central axis 68,152 cooling a portion of the combustion face 138 furthest away from the central axis 68,152. The flow of air from the plurality of openings 142 provides air-sweep cooling for a portion of the combustion face 138. Additional swirling air from the air chamber 134 enters the acutely angled openings 142 relative to the combustion face 138 in base circle C1. The flow of this air extends radially inward from the plurality of openings toward the central axis 68,152 cooling a portion of the combustion face 138. The flow of air from the plurality of openings 142 provides air-sweep cooling for a portion of the combustion face 138 nearest the central axis 68,152.

Convection cooling is also provided for the combustion end 126 at primarily the back face 140. For example, swirling air from the air chamber 134 passes over the back face 140 prior to entering the combustion chamber 40. Furthermore, a small portion of the swirling air exiting the plurality of swirlers 141 is drawn past the combustion face 138 due to the geometry of the plurality of openings 142 being positioned at an acute angle.

In the single gaseous fuel injection nozzle 66 and the dual fuel injection nozzle 150 the cooling of the tip or combustion end 126 is accomplished twofold. First, the plurality of openings 142 being acutely positioned in the combustor end 126 provide an effective method of air-sweep cooling. Secondly, the convection cooling of the back face 140 and the combustion face 138 provides an effective method of convection cooling. The two methods combined provide an effective efficient cooling of the combustor end 126 or tip. In this application, the methods maintain the combustor end temperature at a temperature hot enough to prevent deposits of combustion generated carbon that can interfere with fuel atomization and dispersion, resulting in poor combustion efficiency and hot spots. And, the temperature is maintained below about 800 degrees C. which prevents failure caused by oxidation, cracking and buckling.

We claim:

1. A fuel injection nozzle having a central axis, comprising:

an outer casing coaxially positioned about the central axis;

a combustor end being attached to the outer casing and having a combustor face and a back face, said combustor face being generally perpendicular to said central axis;

a member being attached within the outer casing forming a chamber therebetween being in fluid communication with a source of fuel;

an air chamber being formed between said combustor end and said member and being in fluid communication with a source of compressed air; and, a plurality of openings being formed in the combustor end between the combustor face and the back face and communicating with the compressed air in the air chamber, said plurality of openings being at an acute angle to the combustor face and being radially spaced about the central axis, such that a plurality of base circles are formed, in which a portion of said plurality of openings which are disposed along said plurality of base circles are tangent to their respective base circle, such that compressed air discharged therefrom initially flows in a direction tangent to their respective base circle at said acute angle to the combustor face.

2. The fuel injection nozzle of claim 1 wherein the plurality of openings disposed on at least one of the individual base circles each have the same acute angle to the combustor face.

3. The fuel injection nozzle of claim 1 wherein the plurality of openings disposed on at least one of the individual base circles have a portion of said plurality of openings disposed at a different acute angle to the combustor face than another portion of said plurality of openings.

4. A dual fuel injection nozzle having a central axis, comprising:

- an outer casing coaxially positioned about the central axis;
- a combustor end being attached to the outer casing and having a combustor face and a back face, said combustor face being generally perpendicular to said central axis;
- a member being attached within the outer casing forming a chamber therebetween with the chamber being in fluid communication with a source of gaseous fuel;
- an annular groove positioned in said member and being in fluid communication with a source of liquid fuel;
- an air chamber being formed between said combustor end and said member and being in fluid communication with a source of compressed air; and,
- a plurality of openings being formed in the combustor end between the combustor face and the back face and communicating with the compressed air in the air chamber, said plurality of openings being at an acute angle to the combustor face and being radially spaced about the central axis, such that a plurality of base circles are formed, in which a portion of said plurality of openings which are disposed along said plurality of base circles are tangent to their respective base circle, such that compressed air discharged therefrom initially flows in a direction tangent to their respective base circle at said acute angle to the combustor face.

5. The fuel injection nozzle of claim 4 wherein the plurality of openings disposed on at least one of the individual base circles each have the same acute angle to the combustor face.

6. The fuel injection nozzle of claim 4 wherein the plurality of openings disposed on at least one of the individual base circles have a portion of said plurality of openings disposed at a different acute angle to the combustor face than another portion of said plurality of openings.

* * * * *